United States Patent [19]
Tchejeyan

[11] Patent Number: 5,629,767
[45] Date of Patent: May 13, 1997

[54] IR LASER LINE-OF-SIGHT ALIGNMENT

[75] Inventor: Sarkis K. Tchejeyan, Santa Barbara, Calif.

[73] Assignee: Delco Electronics Corporation, Kokomo, Ind.

[21] Appl. No.: 486,496

[22] Filed: Jun. 7, 1995

[51] Int. Cl.$^6$ .............................. G01B 11/26; G01C 1/00
[52] U.S. Cl. ......................... 356/153; 356/152.3; 33/348
[58] Field of Search .................... 356/399–401, 356/153, 152, 154, 142; 33/270–278, 345–358

[56] References Cited

U.S. PATENT DOCUMENTS

| | | | |
|---|---|---|---|
| 2,887,927 | 5/1959 | Newton | 33/348 |
| 3,752,587 | 8/1973 | Myers | 356/153 |
| 4,422,758 | 12/1983 | Godfrey | 356/152 |
| 4,763,419 | 8/1988 | Whitman, III | 33/272 |
| 4,908,948 | 3/1990 | Gormley | 33/276 |
| 5,009,502 | 4/1991 | Shih | 356/152 |
| 5,151,753 | 9/1992 | Whitman, III | 356/142 |

*Primary Examiner*—Frank Gonzalez
*Assistant Examiner*—Michael P. Stafira
*Attorney, Agent, or Firm*—W. C. Schubert; W. K. Denson-Low

[57] ABSTRACT

A method of visually aligning an optical instrument (10, 26, 28) that simultaneously operates at two different wavelengths where the first wavelength is in the visible photopic electromagnetic spectral region and the second wavelength is outside the visible photopic electromagnetic spectral region. The method for visually aligning the optical instrument (10, 26, 28) includes employing an aiming reticle (12) located at the eyepiece (18) of the optical instrument (10, 26, 28), this first reticle (12) having a reticle pattern (64) which is in focus when viewed through the eyepiece (18), and a plate (44) with a second reticle pattern (62) on one side. The second reticle pattern (62) is positioned in the optical system such that when this second reticle pattern (62) is illuminated (58) with light of the first wavelength, then this second reticle pattern (62) will be in focus and superimposed on the first reticle pattern (64) when viewed through the eyepiece (18). Alignment can then be accomplished by aligning the focused image (62') of the second reticle pattern (62) onto the first reticle pattern (64) displayed at the eyepiece (18). The method for visual alignment allows the operator to use his/her eyes to align a coaxial optical instrument (10, 26, 28), such as visual telescope (10) and an infrared laser (26, 28) which operates outsides the visible spectrum.

24 Claims, 1 Drawing Sheet

IR LASER LINE-OF-SIGHT ALIGNMENT

TECHNICAL FIELD

The present invention relates to a method of visually aligning an optical instrument such as an infrared laser sight system where the laser operates outside the photopic region of the spectrum. Specifically, the present invention allows the operator to use his/her eyes to align a coaxial optical instrument, such as visual telescope and an infrared laser, which operates outside the visible spectrum.

BACKGROUND ART

The alignment of an optical instrument when it operates at two different wave-lengths is a difficult undertaking, especially when one of the wavelengths is outside the visible photopic electromagnetic spectral region. Due to the difference of the index of refraction at the two wavelengths, the rays are bent at different rates when they are refracted through a lens. The measurement becomes particularly difficult because aligning the optical instrument where an infrared wavelength is employed requires special instruments. One may measure the effect the rays will have on appropriate detectors under controlled conditions, or simulate laboratory conditions using special instruments. However, these indirect measurements often give uncertain results and become the cause of errors.

Thus, what is needed is a method of alignment verification that allows the operator to use his/her eyes to align an optical instrument.

DISCLOSURE OF INVENTION

In accordance with the present invention, a method is provided for visually aligning an optical instrument that simultaneously operates at two different wavelengths where the first wavelength is in the visible photopic electromagnetic spectral region and the second wavelength is outside the visible photopic electromagnetic spectral region. The method for visually aligning the optical instrument includes employing a first reticle pattern located at the eyepiece of the optical instrument, the first reticle pattern being in focus when viewed through the eyepiece. A second reticle pattern is positioned in the optical system, i.e., in a laser receiver channel, such that when the second reticle pattern is illuminated with light of the first wavelength, then the second reticle pattern will be in focus and superimposed on the first reticle pattern when viewed through the eyepiece after reflecting on itself via a retro-reflector. Alignment can then be accomplished by aligning the focused image of the second reticle pattern onto the first reticle pattern displayed at the eyepiece. In some cases, visual alignment of the optical system may require illuminating the second reticle pattern with light of the first wavelength and visible illumination can be provided by a light source at the edge of the second reticle pattern so as to enable the alignment of this optical instrument which operates outside the visible region of the spectrum.

In a case such as the alignment of a visual telescope and an infrared laser, a removable retroreflector may be inserted in the collimated space of the telescope, so that the second reticle pattern may be viewed at the eyepiece. The second reticle pattern may be located on a plate with the second reticle pattern on one side and a clear field stop on the opposite side. The thickness and orientation of the plate can be adjusted such that when the removable retroreflector is inserted in the collimated space of the telescope then the beams of the second wavelength originating from infrared laser will come to focus on the clear field stop.

It is, therefore, an object of the present invention to provide a viable aiming device for laser range finders which operate outside the visible spectrum.

Another object of the present invention is to allow the alignment of the instrument to be performed by an untrained operator in the outside environment in the field.

Other objects, features, and advantages of the present invention will become apparent upon consideration of the following detailed description and accompanying drawings, in which like reference designations represent like features throughout the Figures.

BRIEF DESCRIPTION OF THE DRAWINGS

FIG. 1 is a flat view schematic diagram of a telescope with eyesafe laser range finder illustrating an application of the invention;

BEST MODES FOR CARRYING OUT THE INVENTION

Reference is now made in detail to a specific embodiment of the present invention, which illustrates the best mode presently contemplated by the inventor for practicing the invention.

Figure 1A:
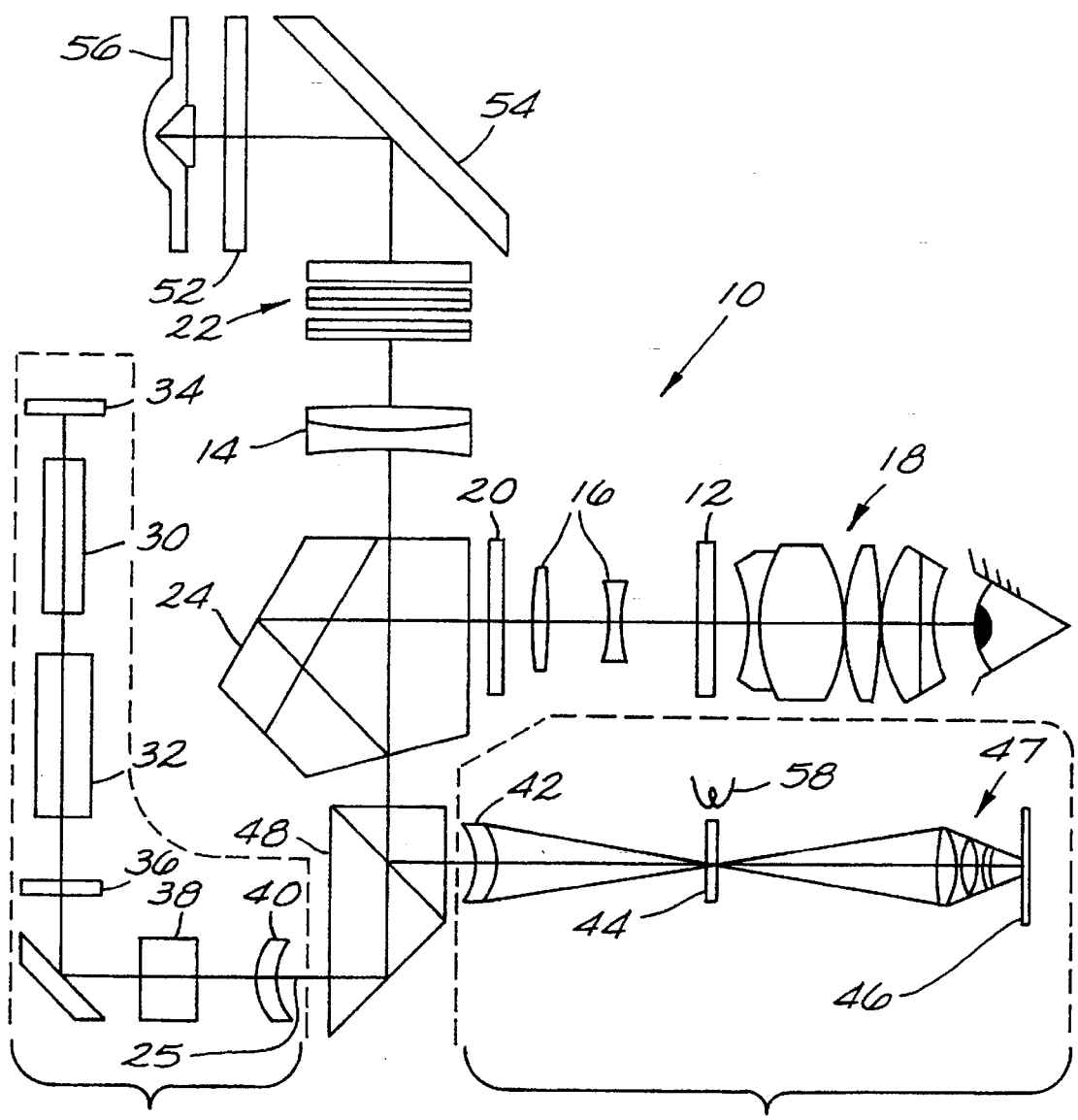
FIG. 1a is a view of the laser field stop plate with etched reticle depicting a pin hole on one side and a second reticle pattern, such as an open cross-line, symmetrically-etched on the opposite side.
Figure 1A:
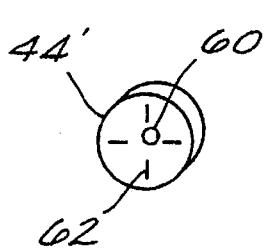

FIG. 1 is a flat view schematic diagram of a telescope with an eyesafe laser range finder which illustrates an application of the invention. The basic instrument comprises a fixed power telescope 10 and ballistic reticle (first plate) 12. The fundamental elements of the telescope 10 include a primary lens 14, field lenses 16, and an eyepiece 18. Additionally, a removable filter 20 and a set of filters 22 have been included in the telescope 10. A beam splitter/penta roof prism 24 directs an infrared laser beam 25 into the telescope 10.

The laser beam 25 is generated in a laser having two channels: a transmitter 26 and a receiver 28. The laser transmitter 26 includes a Nd:YAG rod 30 and a Raman cell 32 enclosed by two partial mirrors 34 and 36, the later being followed by a filter 38 and a lens 40. The laser receiver 28 comprises a focusing lens 42, a laser field stop plate (second plate) 44 and a detector 46 with accompanying condenser optics 47. An additional beamsplitter 48 allows light to be coupled into the laser receiver 28. The telescope 10, the laser transmitter 26, and the laser receiver 28 are coaxial to each other.

The infrared laser beam 25 generated by the laser transmitter 26 passes through the two beam splitters 48 and 24 and exits the instrument at the window 52 after being reflected at the sighthead mirror 54. Light entering the telescope 10 will be coupled to both the eyepiece 18 and the detector 46 via these two beamsplitters 24 and 48 respectively. For the alignment of the two beams, a removable retroreflector 56 is inserted in the collimated space, i.e., in front of the window 52.

In order to maintain the accuracy of the optical instrument, the laser receiver 28 has to be in perfect alignment with the ballistic reticle (the first plate having a first reticle pattern to be described more fully below) 12 which is located at the eyepiece 18 of the telescope. The operator views the ballistic reticle 12 through the eyepiece 18 and under normal conditions, the observer cannot see the laser channel.

The operator may view the laser channel by inserting the retroreflector 56 in a collimated space of the telescope 10 and illuminating the laser receiver field stop plate 44 with a light source 58 located at the edge of the stop as described more fully below. However, if the operator tries to view the image of a conventional field stop, it will appear out of focus because the optics in the laser channel are designed for the infrared laser wavelength. For example, the optical system of the telescope is designed for the photopic region (425 to 650 nm) and the laser optics are optimized for the infrared (i.e., 1540 nm). The out-of-focus image of the field stop plate 44 with respect to the ballistic reticle 12 will give a parallax error. This will create an alignment error (parallax) and cause the laser range finder to make false readings.

In order to correct this condition of uncertainty, the inventor has modified the laser receiver field stop design to allow the operator to observe the field stop plate 44 in sharp focus without altering the function of the laser receiver.

The exact location where optical rays come to focus depends on the effective deviation of the beam in refractive space. The rate of refraction is a function of the index of refraction of the medium at different wavelengths. Under normal conditions, shorter wavelengths have a higher refractive index. For example, the refractive index of borosilicate crown glass, BK7, at 589 nm is 1.5167, and at 1530 nm it is 1.5009. This will force the rays at the shorter wavelengths to come to focus sooner after refraction compared to the longer wavelengths.

Therefore, the apparatus of the present invention employs as the field stop plate 44 a plate (or an optical element) 44' shown in FIG. 1a, which has a pin hole (or clear field stop) 60 on one side and a second reticle pattern, such as an open cross-line 62, symmetrically-etched on the opposite side. This second reticle pattern 62 is positioned in the optical system such that when the removable retroreflector 56 is inserted in the collimated space in front of the telescope window 52 and the second reticle pattern is illuminated with light of the first wavelength, then the second reticle pattern will be collimated, and after retroreflection, superimposed on the ballistic reticle 12, when viewed through the eyepiece. The thickness, t, and the orientation of the field stop plate 44' is established for a given instrument such that when the clear field stop 60 is illuminated with infrared light, then the clear field stop will be in focus when viewed through the eyepiece while the energy from the infrared light will pass through the pin hole and be focused on the detector 46. When the removable retroreflector 56 is inserted in front of the telescope window 52 and the edge-lighting of the field stop plate 44' is provided with a light source 58, the position of the clear field stop 60 and the second reticle pattern 62 will also match to the points where infrared beam from the laser transmitter 26 will come to focus on one side and the visible beams will come to focus on the opposite side.

Figure 2:
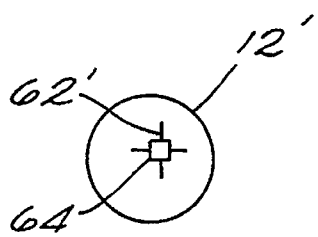
FIG. 2 depicts the open cross-line reticle pattern of the laser field stop plate superimposed on the ballistic reticle as seen through the eyepiece.

Because of the laws of refraction, when edge-lighting of the field stop plate 44' is provided with the light source 58, the viewer looking via a retroreflector 56 inserted in the collimated space in front of the telescope window 52, will see the second reticle pattern 62 in focus and superimposed on the first reticle pattern 64 (see FIG. 2) which is etched on the ballistic reticle 12, both the second reticle pattern and the ballistic reticle being displayed at the eyepiece 18 FIG. 2 shows a focused image 62' of the second reticle pattern (which in this case is the open cross-line reticle pattern) 62, superimposed on the ballistic reticle 12' as seen through the eyepiece 18. The well-defined open cross-line reticle pattern 62 will allow the operator to be able to focus and align the pattern onto the ballistic reticle 12' with certainty. For example, the operator may align the focused image 62' of the open cross-line reticle pattern 62 on the field stop plate 44' onto the center of the ballistic reticle 12' where the first reticle pattern 64, which may be a circle or a square, is etched.

The combination of the pin hole or clear field stop 60 and the second reticle pattern 62 on the field stop plate 44', with a well-defined substrate thickness, t, is the core of this invention. A typical reticle pattern 62 with a pin hole or clear field stop 60 may comprise a glass substrate having a thickness of 3 mm, for example. The clear field stop 60 itself may be made by evaporating Inconel on the glass and generating the small pin hole (e.g., 0.25 mm diameter) as the laser field stop. The second reticle pattern 62 should be defined so that the operator will know how to align the second reticle pattern 62 with respect to the first reticle pattern 64 on the ballistic reticle 12. An open cross-line reticle pattern 62 can be etched on the opposite side of the glass substrate. The two patterns located on opposite sides (the open cross-line reticle pattern 62 and the pin hole 60) may be made very accurately by using photographic techniques which are used commonly in the fabrication of reticles.

The removable cube corner retroreflector 56 allows the observer to view the open cross-line reticle pattern 62 superimposed over the ballistic reticle 12. Cube corner prisms are standard products available with many vendors. The cube corner retroreflector 56 will be used only during the alignment procedure.

INDUSTRIAL APPLICABILITY

The method of infrared laser line-of-sight alignment described herein is expected to find use in the alignment of IR laser receivers to the line-of-sight of telescopes or other sighting instruments. The description herein is a typical application of this invention. Other variants may be made without altering the principles of the proposed invention.

The foregoing description of the preferred embodiment of the present invention has been presented for purposes of illustration and description. It is not intended to be exhaustive or to limit the invention to the precise form disclosed. The method of visually aligning an optical instrument described herein is not limited to aligning laser systems with telescopes but may find uses in aligning other optical instruments such as microscopes, telescopes or medical instruments that simultaneously operate at two wavelengths. Obviously, many modifications and variations will be apparent to practitioners skilled in this art. Certainly, it is possible that the invention may be practiced with other visible and invisible wavelengths. The embodiment was chosen and described in order to best explain the principles of the invention and its practical application, thereby enabling others skilled in the an to understand the invention for various embodiments and with various modifications as are suited to the particular use contemplated. It is intended that the scope of the invention be defined by the claims appended hereto and their equivalents.

What is claimed is:

1. A method of visually aligning an optical instrument that simultaneously operates at two different wavelengths where said first wavelength is in the visible photopic electromagnetic spectral region and said second wavelength is outside the visible photopic electromagnetic spectral region, said method comprising:

(a) employing a first plate having a first reticle pattern which is in focus when viewed through the eyepiece of said optical instrument;

(b) inserting a removable retroreflector in said optical instrument;

(c) employing a second plate having a second reticle pattern which is positioned in said optical instrument such that when said second reticle pattern is illuminated with light of said first wavelength, then said second reticle pattern will be in focus and superimposed on said first reticle pattern when viewed through said eyepiece; and (d) aligning the focused image of said second reticle pattern onto said first reticle pattern displayed at said eyepiece.

2. The method of claim 1 where visual alignment of said optical instrument is accomplished by illuminating said second reticle pattern with light of said first wavelength.

3. The method of claim 2 where said illumination is provided by a light source at the edge of said second reticle pattern.

4. The method of claim 1 where visual alignment of said optical instrument includes adjustment of said optical instrument to bring said second reticle pattern into sharp focus as seen through said eyepiece.

5. The method of claim 1 where said second plate comprises said second reticle pattern on one side and a clear field stop on the opposite side and the thickness and orientation of said second plate being such that when said clear field stop is illuminated with light of said second wavelength said clear field stop will be in focus and superimposed on said first reticle pattern when viewed through said eyepiece.

6. The method of claim 5 where said clear field stop is a pin hole.

7. The method of claim 1 where said second wavelength is in the infrared region of the spectrum.

8. The method of claim 1 where said second reticle pattern is an open cross-line.

9. A method of visually aligning an optical instrument that simultaneously operates at two different wavelengths where said first wavelength is in the visible photopic electromagnetic spectral region and said second wavelength is outside the visible photopic electromagnetic spectral region, said optical instrument consisting of a telescope operating at said first wavelength and a laser operating at said second wavelength and said method comprising:

(a) employing a first plate having a first reticle pattern, said first plate being located at the eyepiece of said telescope, said first reticle pattern being in focus when viewed through said eyepiece;

(b) inserting a removable retroreflector in the collimated space of said telescope;

(c) employing a second plate having a second reticle pattern which is positioned in said optical instrument such that when said second reticle pattern is illuminated with light of said first wavelength and said removable retroreflector is inserted in said collimated space of said telescope then said second reticle pattern will be in focus and superimposed on said first reticle pattern when viewed through said eyepiece; and (d) aligning the focused image of said second reticle pattern onto said first reticle pattern displayed at said eyepiece.

10. The method of claim 9 where visual alignment of said optical instrument is accomplished by illuminating said second reticle pattern with light of said first wavelength.

11. The method of claim 10 where said illumination is provided by a light source at the edge of said second reticle pattern.

12. The method of claim 9 where visual alignment of said optical instrument includes adjustment of said optical instrument to bring said second reticle pattern into sharp focus as seen through said eyepiece.

13. The method of claim 9 where said second plate comprises said second reticle pattern on one side and a clear field stop on the opposite side and the thickness and orientation of said second plate being such that when said removable retroreflector is inserted in said collimated space of said telescope then the beams of said second wavelength originating from said laser will come to focus on said clear field stop.

14. The method of claim 13 where said clear field stop is a pin hole.

15. The method of claim 9 where said second wavelength is in the infrared region of the spectrum.

16. The method of claim 9 where said second reticle pattern is an open cross-line.

17. An optical element for visually aligning an optical instrument that simultaneously operates at two different wavelengths where said first wavelength is in the visible photopic electromagnetic spectral region and said second wavelength is outside the visible photopic electromagnetic spectral region, said optical instrument having a first plate having a first reticle pattern, said first plate being located at the eyepiece of said optical instrument, said first reticle pattern being in focus when viewed through said eyepiece, said optical element comprising a second plate which has a second reticle pattern on one side and a clear field stop on the opposite side, the position of said second plate being such that when said second reticle pattern is illuminated with light of said first wavelength and a removable retroreflector is inserted in said optical instrument, then said second reticle pattern will be in focus and superimposed on said first reticle pattern when viewed through said eyepiece such that alignment of said optical instrument can be accomplished by aligning the focused image of said second reticle pattern onto said first reticle pattern displayed at said eyepiece, and the thickness and orientation of said second plate being such that when said clear field stop is illuminated with light of said second wavelength and said removable retroreflector is inserted in said optical instrument, then said clear field stop will be in focus and superimposed on said first reticle pattern when viewed through said eyepiece.

18. The optical element of claim 17 where visual alignment of said optical instrument is accomplished by illuminating said second reticle pattern with light of said first wavelength.

19. The optical element of claim 18 where said illumination is provided by a light source at the edge of said second reticle pattern.

20. The optical element of claim 17 where said removable retroreflector is inserted in said optical instrument so that said second reticle pattern may be viewed at said eyepiece.

21. The optical element of claim 17 where visual alignment of said optical instrument includes adjustment of said optical instrument to bring said second reticle pattern into sharp focus as seen through said eyepiece.

22. The optical element of claim 17 where said clear field stop is a pin hole.

23. The optical element of claim 17 where said second wavelength is in the infrared region of the spectrum.

24. The optical element of claim 17 where said second reticle pattern is an open cross-line.

* * * * *